United States Patent [19]

Re et al.

[11] Patent Number: 4,849,493

[45] Date of Patent: Jul. 18, 1989

[54] USE OF TERTIARY AMINIC COMPOUNDS CONTAINING AT LEAST THREE ACTIVE HYDROGENS IN THE PREPARATION OF POLYMERS CONTAINING PERFLUOROPOLYETHEREAL CHAINS

[75] Inventors: Alberto Re, Milan; Marco De Giorgi, Varese, both of Italy

[73] Assignee: Ausimont S.p.A., Milan, Italy

[21] Appl. No.: 191,188

[22] Filed: May 6, 1988

[30] Foreign Application Priority Data

May 12, 1987 [IT] Italy ................................ 20467 A/87

[51] Int. Cl.$^4$ ............................................ C08G 18/38
[52] U.S. Cl. .................................. 528/70; 252/182.15
[58] Field of Search ...................... 528/70; 252/182.15

[56] References Cited

U.S. PATENT DOCUMENTS 3,810,874  5/1974  Mitsch et al. ...................... 528/70

Primary Examiner—Maurice J. Welsh
Attorney, Agent, or Firm—Stevens, Davis, Miller & Mosher

[57] ABSTRACT

Non-fluorinated tertiary aminic compounds, comprising two or more functional groups containing at least three active H, of the hydroxyl or aminic or thiol type, are utilized, in the form of a homogeneous mixture with perfluoropolyethers having hydroxy end groups, to prepare by means of polycondensation and cross-linking reaction with fluorinated or non-fluorinated polyisocyanates, carried out in the absence of catalysts, the corresponding polymers containing the perfluoropolyethereal chain deriving from the perfluoropolyether having hydroxy end groups.

5 Claims, No Drawings

USE OF TERTIARY AMINIC COMPOUNDS CONTAINING AT LEAST THREE ACTIVE HYDROGENS IN THE PREPARATION OF POLYMERS CONTAINING PERFLUOROPOLYETHEREAL CHAINS

The use of polyols having a perfluoropolyethereal chain of the type described in U.S. Pat. No. 3,810,874 (Mitsch) in the preparation of polymers, in particular cross-linked fluorinated polyurethanes, permits to obtain elastomeric materials characterized by utmost interesting chemico-physical and mechanical properties such as a very low glass transition temperature (lower than $-80°$ C.), a low surface tension, a high oil and water-repellency, a high resistance to hydrolysis, to chemical and atmospheric agents and to solvents. An improvement in the mechanical properties, as regards tenacity and tensile strength, without impairing the flexibility at low temperatures, is obtainable by the introduction of aromatic or cycloaliphatic diols, according to what is described in Italian patent application No. 19497 A/85 (T.3350) filed by the Applicant hereof.

When preparing polyurethanes by using perfluoropolyethereal polyols, these can be reacted with conventional non-fluorinated diisocyanates, such as toluene diisocyanate, hexamethylene diisocyanate, isophorone diisocyanate, or with fluorinated diisocyanates of the type described in U.S. Pat. 3,810,874 (Mitsch) having a perfluoropolyethereal structure.

The reaction is conducted in mass or in a solvent at temperatures ranging from 50° C. to 100° C. and requires the presence of a catalyst such as a Sn compound (dibutyl tin acetate, dibutyl tin dilaurate) or a Fe compound (ferroacetylacetonate) or other compounds.

Cross-linking of the prepolymer, depending on whether it has hydroxy or isocyanic functional end groups, can be effected with polyisocyanates or with polyols of the conventional type. When the prepolymer contains isocyanic end groups, cross-linking can be also obtained by trimerization of the isocyanic groups in the presence of proper catalysts.

The polymers so obtained are affected, in most of cases, by the drawback of being opaque due to the incompatibility of the fluorinated and non-fluorinated (hydrogenated) structures of the starting products, furthermore they are polluted by the presence of catalyst residues which may alter the performances of the elastomers, giving rise also to degradation phenomena. Therefore, they are not suitable for uses where (optical, photoelectronic) transparency is required or for uses where a high purity degree of the materials is needed (biomedical field, electronic field).

Object of the present invention is the use of non-fluorinated tertiary aminic compounds containing two or more hydroxy or aminic or thiol functional groups having in the aggregate at least three active H, in the form of a homogeneous mixture with a perfluoropolyether having hydroxy end groups, for the preparation of polymers, by polycondensation and cross-linking reaction with polyisocyanates, either of the fluorinated or non-fluorinated type, carried out in the absence of catalysts. The polymers so obtained, which are free from catalyst residues, are characterized by a high transparency, an exceptional flexibility at low temperatures, a high stability to heat and to hydrolysis and specific surface properties.

The tertiary aminic compounds of the invention contain one or more tertiary aminic groups and two or more functional groups which are reactive with the isocyanic (i.e., isocyanate) groups and are selected from the hydroxy groups, the primary or secondary aminic groups, the thiol groups. The functionality must be equal to at least three, wherefore at least three active hydrogen atoms must be present for each molecule. They are represented by the following formulas :

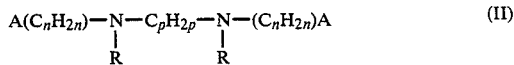

wherein :

$A = -OH$, $-NH_2$, $-NHR'$ ($R' = C_1-C_{12}$ alkyl), $-SH$ $R = C_1-C_{12}$ alkyl or $-A(C_nH_{2n})$ $C_nH_{2n}$, either straight or branched, with $n = 1-12$ $C_pH_{2p}$, either straight or branched, with $p = 1-12$.

The above compounds are characterized in that they form perfectly homogeneous mixtures, in any ratio, with perfluoropolyethers having hydroxy end groups. Such perfect compatibility with the perfluoropolyethers is the reason why the polyurethanes prepared starting from the mixture exhibit very particular properties, in particular a high transparency, what is surprising as the polyurethane macromolecule contains perfluropolyethereal chains and non-fluorinated ("hydrogenated") structures deriving from the tertiary aminic compounds of the present invention.

Examples of such tertiary aminic compounds are :
(a) triethanolamine $N(CH_2CH_2OH)_3$
(b) N,N,N',N'-tetrakis (2-hydroxyethyl)-ethylenediamine of formula : $(HOCH_2CH_2)_2N-CH_2CH_2-N(CH_2CH_2OH)_2$
(c) N,N,N',N'-tetrakis (2-hydroxypropyl)-ethylenediamine
(d) tris-(2-mercaptoethyl)-amine: $(HSCH_2CH_2)_3N$
(e) tris-(2-aminoethyl)-amine: $(H_2NCH_2CH_2)_3N$.

The compounds with tertiary N according to the invention can be used in admixture with the corresponding compounds of formulas (I) and (II)in which R = H, such as the diethanolamine compound of formula $HN(CH_2CH_2OH)_2$.

The perfluopolyethers with hydroxyl end groups to be used in admixture with the compounds having a tertiary aminic group of formula (I) or (II) can be defined by the following general formula :

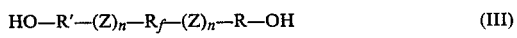

where :

$R_f$ represents an oxyperfluoroalkylene chain having an average molecular weight from 400 to 8000, $n = 0$ or 1;

Z is a divalent linking radical such as for example : $-CF_2-$, $-O-$, $-CH_2O-$, $-CONH-$, $-CH_2O-CH-$, $-CH_2OSO_2-$, $-CH_2-$;

R' and R are aliphatic divalent radicals with $C_1-C_{12}$, in particular they can be $-(CH_2)_{1-12}-$ or cycloaliphatic or aromatic divalent radicals;

R can be an oxyalkylene radical $-(OC_aH_{2a})_m-$ and R' can be an oxyalkylene radical $-(C_aH_{2a}O)_m-$, where $a = 1-3$ and $m = 1-10$.

The oxyperfluoroalkylene chain $R_f$ may comprise, in particular, repeating units of the following types:

(I) —$(CF_2CF_2O)$—, —$(CF_2O)$—, said units being statistically distributed along the perfluoropolyethereal chain;

(II)

with X=F or $CF_3$, said units being statistically distributed along the perfluoropolyethereal chain;

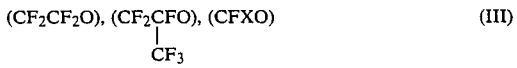
(III)

with X=F or $CF_3$, said units being statistically distributed along the perfluoropolyethereal chain;

(IV)

(V) $(CH_2CF_2CF_2O)$;
(VI) $(CF_2CF_2CF_2O)$;

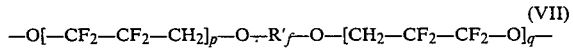
(VII)

where $R'_f$ is a fluoroalkylene group, p and q are integers from 0 to 200, and p+q is at least 1;

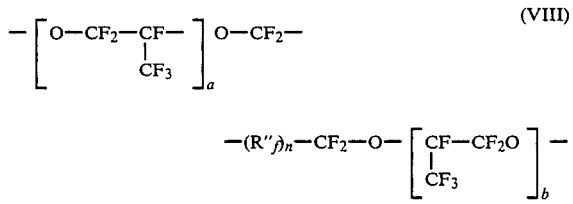
(VIII)

where $R''_f$ is a fluoroalkylene group, n is 0 or 1, a and b are integers and a+b is at least 1;
(IX) $(CF_2CF_2O)$;

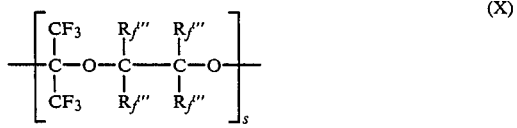
(X)

where $R_f'''$ is fluorine or a perfluoroalkyl and s is at least 8.

The starting perfluoropolyethers of classes III, IV, IX can be functionalized at both ends for example by means of the separation process described in Italian patent application No. 22920 A/85, which gives rise to acid end groups —COF, which are readily convertible into the desired hydroxylated functional groups by following the teachings of the patents indicated hereunder.

The hydroxy end groups can be introduced into the starting perfluoropolyethereal compound according to known methods; reference is to be made in particular to U.S. Pat. No. 3,810,874 and 3,847,978, and to Italian patent No. 903,446.

As starting perfluoropolyethers it is possible to use products which are broadly known in the art and are described in particular in patents: U.S. Pat. Nos. 3,242,218, 3,665,041, 3,715,378, EP No. 148,482, EP No. 151,877, U.S. Pat. No. 4,523,039 and PCT patent application WO 87/00538.

The polymers according to the invention are prepared by reacting a mixture of a perfluoropolyether diol of the above-cited classes and of a compound of general formula (1) or (11), with an aliphatic or a cycloaliphatic or an aromatic polyisocyanate, either of the fluorinated or non-fluorinated type, in the absence of common catalysts such as metallorganic Sn or Fe compounds, at a temperature ranging from 25° to 100° C., the ratio between perfluoropolyether diol and tertiary aminic compound of formula (1) or (11), expressed as ratio between the equivalents of functional groups of the one or of the other being comprised between 0.1 and 10, preferably between 0.5 and 5. The polyisocyanate is used in such amount that the ratio between the NCO equivalents and the hydroxyl (either aminic or thiolic) equivalents ranges from 0.5 to 2 and preferably from 1 to 1.1.

The mixtures consisting of the perfluoropolyether diol and of the compound of formula I or II are particularly suitable for preparing polyurethanes.

Fluorinated-type polyisocyanates particularly suitable for the preparation of the polyurethanes according to the invention are the ones consisting of a perfluoropolyethereal chain having isocyanic groups at the end: that results in maximum values of the characteristics connected with fluorine content, furthermore, admixing of isocyanate with the prepolymer, even at room temperature and in the absence of solvents, leads to perfectly homogeneous compositions. Perfluoropolyethereal polyisocyanates can have a perfluoropolyethereal chain of the same type as indicated for the perfluoropolyether diols; the introduction of the isocyanic end groups occurs according to known methods, see for example U.S. Pat. No. 3,810,874.

Should a non-fluorinated diisocyanate such as toluene diisocyanate, hexamethylene diisocyanate, isophorone diisocyanate be utilized, in order to obtain a high transparency of the polyurethane it is preferable to prepare a prepolymer with a portion of the perfluoropolyether diol and with the non-fluorinated diisocyanate and subsequently to use the mixture of the invention along with this prepolymer. The polyurethanes obtained according to the present invention are transparent elastomers, free from residual tackiness and insoluble in the common organic solvents, in particular in the fluorinated solvents such as 1,1,2-trifluorotrichloroethane or mixtures thereof.

They exhibit an excellent flexibility at very low temperatures, having a glass transition temperature lower than −80° C. and in many cases lower than −100° C.

Furthermore, they are resistant to the commonest chemical agents and are stable to hydrolytic degradation. They exhibit, moreover, a very low refraction index, below 1.40.

APPLIANCES

The polymers of the present invention are usefully utilizable to provide protective coatings, characterized by their self-lubricating properties, low wettability, high resistance to atmospheric agents and excellent optical and dielectric properties.

Another important utilization is that as a high-density binder for propellant mixtures for rockets.

In this case, the mixture object of the present invention is charged with the oxidizing substance (for example perchlorate), with the solid fuel (for example aluminium powder) and, after addition of the diisocyanate, the resulting mixture is poured into a suitable container and is caused to cure under proper conditions.

The polymeric products according to the invention exhibit the advantage of being able to reach a sufficient cross-linking degree and, consequently, a sufficient degree of hardness and of mechanical properties, also if curing is made to occur at room temperature.

At any rate it is possible to adjust the mixture pot-life by acting on the temperature or by adding minimum amounts of a catalyst.

A further utilization of the polymeric products according to the invention is in the field of the adhesives. The extremely low Tg value and the consequent good flexibility at low temperatures is an important feature for the use in apparatuses subjected to very low temperatures.

The following examples are given merely to illustrate the present invention and are not to be construed as being a limitation of the possible embodiments thereof.

To determine the characteristics of the obtained products, the following standards have been adopted:

| | |
|---|---|
| Hardness (Shore A) | ASTM 2240 |
| Tensile strength (MPa) | ASTM D 412 |
| Elongation at break (%) | ASTM D 457 |
| Friction coefficient | ASTM D 1894 |
| Contact angle | ATICELCA MC 21-72 |
| Resistance to hydrolysis, at 70° C. and 50% of relative humidity. | |

EXAMPLES 1-7

Preparation of mixtures of perfluoropolyether diol and of a hydroxylated tertiary aminic compound As a perfluoropolyether diol there was used a perfluoropolyether consisting of units of class I, with end groups —$CH_2OH$, having an equivalent weight of 1045, designated as Z DOL 2000, and an analogous compound having an equivalent weight of 2104, designated as Z DOL 4000. As a compound containing tertiary aminic nitrogen, one of the following was used:

N,N,N',N'-tetrakis(2-hydroxypropyl)-ethylenediamine (designation THPED)

N,N,N',N'-tetrakis(2-hydroxyethyl)-ethylenediamine (designation THEED)

triethanolamine (designation THEA).

The mixtures were prepared by simple mixing at room temperature. They appeared as colorless limpid liquids, which did not give rise to separation of the components even after a long-lasting storage (6 months).

The characteristics of the prepared mixtures are reported on Table 1.

TABLE 1

| EXAMPLE | ZDOL 2000 (eq) | ZDOL 4000 (eq) | THPED (eq) | THEED (eq) | THEA (eq) | HYDROXYL N. | 20C (CP) | 20C | % F WEIGHT |
|---|---|---|---|---|---|---|---|---|---|
| 1 | 1 | | 1 | | | 100.4 | 310 | 1.72 | 57 |
| 2 | 1 | | | 2 | | 141.3 | 375 | 1.67 | 55 |
| 3 | 1 | | — | | 1 | 102.5 | 280 | 1.72 | 57 |
| 4 | | 1 | 1 | | | 51.6 | 350 · | 1.76 | 60 |
| 5 | | 2 | | 2 | | 74.8 | 405 | 1.75 | 60 |
| 6 | 1 | | — | | 1 | 101.6 | 300 | 1.73 | 58 |
| 7 | 0.01 | | 1 | 1 | | 690.6 | | | |

EXAMPLE 8

(Comparative Test)

In order to evidence one of the specific characteristics of the mixtures according to the invention, the miscibility of perfluoropolyether diol Z DOL 2000 with aliphatic polyols not containing tertiary aminic nitrogen was examined.

It resulted that 10 g of Z DOL 2000 admixed to 0.43 g of trimethylolpropane (ratios in equivalents equal to about 1/1) did not provide a homogeneous mixture even after heating to 70° C. for 15 minutes.

An analogous result was obtained when glycerine or 1,2,6-hexanetriol was used.

EXAMPLE 9

In the following example, the preparation of a polyurethane according to the formulation object of the invention is described.

30 g of the mixture of example 1 and 49.78 g of a perfluoropolyether diisocyanate Z DISOC having structure:

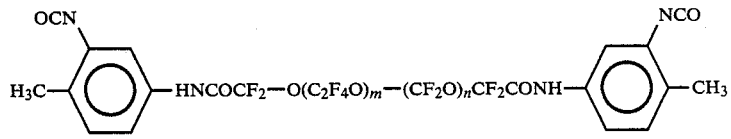

having an average molecular weight of 1765, containing 4.759% by weight of —NCO groups, were mixed in a 250 ml beaker by means of a mechanical blade stirrer, at room temperature, for 1 minute.

The homogeneous and transparent prepolymer so obtained was poured into a 200×130×2 mm mold, was placed between two PTFE sheets and then was put between heated plates of a press. After 20 hours at 50° C. a cross-linked elastomeric polyurethane small plate was obtained, the mechanical properties of which have been determined:

| | |
|---|---|
| Hardness (Shore A) | 50 |
| 100% modulus (MPa) | 1.25 |
| Tensile strength (MPa) | 4.65 |
| Elongation at break (%) | 370 |

EXAMPLES 10-16

Prepared was a series of polyurethanes according to the method and the conditions described in example 9 and using the mixes of examples 1-7 and a perfluoropolyether diisocyanate having perfluoropolyethereal chain with units of class I and end groups of the type:

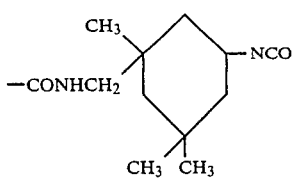

and having an average molecular weight equal to 2540.

The characteristics of the obtained polymeric materials are reported on Table 2.

TABLE 2

| EXAMPLE | 10 | 11 | 12 | 13 | 14 | 15 | 16 |
|---|---|---|---|---|---|---|---|
| Mixture of the Example | 1 | 2 | 3 | 4 | 5 | 6 | 7 |
| Mixture (g) | 30,00 | 24,00 | 30,00 | 45,00 | 37,00 | 30,00 | 6,00 |
| DIISOC (g) | 66,06 | 75,87 | 68,80 | 51,95 | 61,92 | 68,19 | 92,68 |
| Hardness (Shore A) | 21 | 35 | 13 | 5 | 8 | 20 | 95 |
| 100% modulus (MPa) | 0,44 | 0,86 | 0,19 | 0,22 | 0,41 | 0,47 | 6,06 |
| Tensile strength (MPa) | 2,96 | 3,6 | 2,15 | 1,40 | 1,71 | 3,01 | 7,33 |
| Elongation at break (%) | 450 | 375 | 1040 | 415 | 400 | 460 | 165 |

EXAMPLE 17

Into a 250 ml two-neck flask there were introduced 50 g of the mixture of example 1 and, after having deaerated and created a nitrogen atmosphere, 7.56 g of hexamethylene diisocyanate were added under stirring and while heating to 70° C. for 15 minutes. The resulting homogeneous mixture was poured into a mold between two polytetrafluoroethylene sheets and was placed into a heated-plate press. After 16 hours at 50° C. a small plate of colorless polyurethane was obtained, which exhibited the following mechanical properties:

| Hardness (Shore A) | 72 |
|---|---|
| 100% modulus (MPa) | 2.4 |
| Tensile strength (MPa) | 4.2 |
| Elongation at break (%) | 280 |

EXAMPLE 18

A polyurethane sample prepared as is described in example 10, in the form of a 200×130×2 mm plate, was divided into two parts. A part was placed into an oven under controlled humidity conditions, at 70° C. with a relative humidity of 50%, for two weeks.

A comparison between the properties determined on the untreated specimen as such and the ones determined on the specimen subjected to the hydrolytic test revealed in the latter an increase of the tensile strength by 27%, while the elongation at break remained unchanged.

EXAMPLE 19

In order to evidence the catalytic effect of tertiary nitrogen contained in the polyhydroxy compounds according to the invention towards the reaction originating the polyurethanes, a mixture composed of 2.5 g of perfluoropolyether diol Z DOL with a number of OH equal to 62.62, of 0.125 g of trimethylolpropane and of 6.94 g of perfluoropolyether diisocyanate containing 3.38% by weight of —NCO. was prepared by cold mixing the components in a nitrogen atmosphere.

The mixture appeared non-homogeneous. By heating to 80° C. for 3 hours under stirring, a homogeneous prepolymer was obtained, which was placed into an oven at 50° C. By way of comparison, a prepolymer sample prepared according to example 12 was placed into an oven under the same conditions. After 20 hours, the prepolymer prepared with trimethylolpropane, as described above, was still fluid while the one of example 12 was thoroughly cross-linked.

EXAMPLE 20

Into a 100 cc beaker containing 10 cc of Freon 113, there were dissolved 3.5 g of the prepolymer of example 9 and by means of a film-spreading device a film of such solution was spread on a glass sheet. After cross-linking, obtained by a treatment in oven at 50° C. for 104 hours +2 hours at 100° C., the dynamic friction coefficient and the contact angle were measured; the results were: Cof$_D$ (steel) =0.143, contact angle (H$_2$O) =116°. The remaining solution was simultaneously evaporated in a PTFE pan and the prepolymer remained therein was cross-linked under the same condtions as described above. On the about 0.1 mm thick film so obtained, the refraction index was measured: it was equal to 1.3729.

What is claimed is:

1. A mixture in the form of a homogeneous liquid product comprising a perfluoropolyether diol and a compound containing at least a tertiary aminic group and two or more functional groups reactive with the isocyanate groups, of the hydroxy or aminic or thiol type, and with a functionality of at least 3, represented by one of the following formulas:

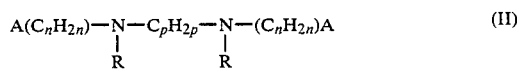

where:
A= —OH, —NH$_2$, —NHR' (R'=C$_1$-C$_{12}$ alkyl), —SH
R=C$_1$-C$_{12}$ alkyl or —A(C$_n$H$_{2n}$)
C$_n$H$_{2n}$ either straight or brached with n =1-12
C$_p$H$_{2p}$ either straight or branched with p =1-12,
the ratio between perfluoropolyether diol and the compound of formula (1) or (11), expressed as ratio of the -OH equivalents of the diol to the equivalents of hydroxy , aminic or thiol functional groups of compound (1) or (II), ranging from 0.1 to 10, preferably from 0.5 to 5.

2. Polymers obtained starting from the mixture of claim 1, by reaction carried out at a temperature from 25° to 100° C., in the absence of catalysts, with a polyisocyanate of the fluorinated or non-fluorinated type, the amount of polyisocyanate being such that the ratio between the -NCO equivalents and the sum of the hydroxy aminic or thiol equivalents ranges from 0.5 to 2, preferably from 1 to 1.1.

3. The mixture according to claim 1, wherein the compound of formula (1) or (11) is selected from:
(a) triethanolamine N(CH$_2$CH$_2$OH)$_3$
(b) N,N,N',N'-tetrakis(2-hydroxyethyl)-ethylenediamine of formula: (HOCH$_2$CH$_2$)$_2$N—CH$_2$CH$_2$—N(CH$_2$CH$_2$OH)$_2$
(c) N,N,N',N'-tetrakis(2-hydroxypropyl)-ethylenediamine
(d) tris-(2-mercaptoethyl)-amine: (HSCH$_2$CH$_2$)$_3$N
(e) tris-(2-aminoethyl)-amine: (H$_2$NCH$_2$CH$_2$)$_3$N.

4. The mixture according to claim 1, wherein the perfluoropolyether diol is represented by formula:

$$HO—R'—(Z)_n—R_f—(Z)_n—R—OH \qquad (III)$$

where:
R$_f$ is an oxyperfluoroalkylene chain having an average molecular weight from 400 to 8000, n =0 or 1;

Z is a divalent linking radical such as for example: —CF$_2$—, —O—, 'CH$_2$O—, —CONH—, —CH$_2$OCH$_2$—, —CH$_2$OSO$_2$—, —CH$_2$—;
R' and R are aliphatic divalent radicals with 1 to 12 C, in particular they can be —(CH$_2$)$_{1-12}$— or cycloaliphatic or aromatic divalent radicals.

5. Mixtures according to claim 4, wherein the perfluorooxyalkylene chain of the perfluoropolyether diol exhibits one of the following structures:
(I) —(CF$_2$CF$_2$O)—, —(CF$_2$O)—, said units being statistically distributed along the perfluoropolyethereal chain;

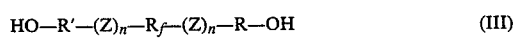
(II)

with X=F or CF$_3$, said units being statistically distributed along the perfluoropolyethereal chain;

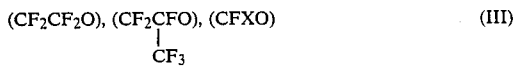
(III)

with X=F or CF$_3$, said units being statistically distributed along the perfluoropolyethereal chain;

(IV)

(V) (CH$_2$CF$_2$CF$_2$O);
(VI) (CF$_2$CF$_2$CF$_2$O);

$$-[O—CF_2—CF_2—CH_2]_p—O—R'_f—O[—CH_2—CF_2—CF_2—O]_q— \qquad (VII)$$

where R'$_f$ is a fluoroalkylene group, p and q are integers from 0 to 200, and p+q is at least 1;

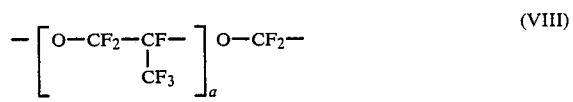
(VIII)

where R'$_f$ is a fluoroalkylene group, n is 0 or 1, a and b are integers and a? b is at least 1;
(IX) (CF$_2$CF$_2$O);

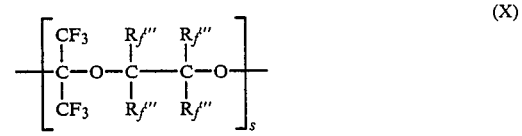
(X)

where R$_f'''$ is fluorine or a perfluoroalkyl and s is at least 8.

* * * * *